Patented Dec. 27, 1932

1,892,100

UNITED STATES PATENT OFFICE

LINN BRADLEY, OF MONTCLAIR, NEW JERSEY, AND EDWARD P. McKEEFE, OF PLATTS-
BURG, NEW YORK, ASSIGNORS TO BRADLEY-McKEEFE CORPORATION, OF NEW
YORK, N. Y., A CORPORATION OF NEW YORK

TREATMENT OF A SODIUM CARBONATE-SODIUM SULPHID RESIDUAL LIQUOR

No Drawing. Application filed April 4, 1928. Serial No. 267,476.

This invention relates to a method for producing a sulphite of sodium from a sulphide of sodium; it also relates to treatment of residual liquor resulting from a digestion treatment of wood, etc., to produce pulp, by means of cooking liquor which includes a sulphur-bearing compound of sodium. More particularly the invention relates to a process for treatment of a furnace product, derived from such residual liquor, which includes sodium carbonate and sodium sulphide so as to produce a regenerated cooking liquor which contains more sodium present as a sulphide of sodium than as a thiosulphate of sodium.

When such a furnace product is treated with water to obtain the sodium carbonate and the sodium sulphide in solution and the resulting solution (maintained relatively cool) is treated directly with free and cool sulphur dioxide (supplied as gaseous sulphur dioxid) to form a sulphite of sodium type of cooking liquor, the regenerated cooking liquor usually contains a considerable amount of thiosulphate as well as a sulphite of sodium. The amount of thiosulphate which may be thus produced and present in such regenerated cooking liquor in proportion to the amount of a sulphite of sodium which may be produced and present in such regenerated cooking liquor depends in part upon the temperature of the liquor and in part upon the ratio of sodium sulphide to sodium carbonate in the solution which is to be sulphited. When the amount of sodium sulphide in such a solution is relatively quite large, the amount of thiosulphate thus produced may be so much as to be commercially objectionable or prohibitive in the regenerated cooking liquor, especially when such cooking liquor is distinctly acid to litmus and contains a relatively large amount of uncombined sulphur dioxide, such as a cooking liquor which contains both sodium acid sulphite ($NaHSO_3$) and sulphurous acid ($H_2SO_3$).

The present invention is based upon the discovery that a solution containing sodium sulphide, either with or without sodium carbonate, can be treated with available sulphur dioxide so as to form a volatile sulphide from sulphur content of the sodium sulphide and so as to remove such volatile sulphid from the solution and so as to convert a large portion of the sodium content of the sodium sulphide into sodium sulphite, providing the solution is maintained substantially non-acid in character and at a relatively high temperature (e. g. around 100 deg. C.) while introducing available sulphur dioxide, thereby providing a solution which contains more sodium present as a sulphite of sodium than as a thiosulphate of sodium. The amount of thiosulphate-sulphur in such resulting solution in proportion to the amount of sulphite-sulphur therein can be thereby suitably regulated.

The volatile sulphide removed from the solution may be oxidied to form sulphur dioxide or it may be treated with available sulphur dioxide to form elementary sulphur; and either sulphur dioxide or sulphur may be regained in any suitable manner and may be employed in forming a sulphite of sodium.

According to one embodiment of the invention, we prepare such a solution containing sodium sulphide and sodium carbonate by treating such a furnace product with a suitable amount of water so as to produce a relatively concentrated solution. By employing hot water, or otherwise obtaining a hot solution, the concentrated solution may be obtained at a temperature of between, for example, 60 and 100 deg. C. Such solution is further heated, if needed, for example by introducing steam thereinto in regulated amount, so that the solution is brought up to the boiling-point, and the solution is maintained at or near the boiling-point while available sulphur dioxide is being introduced into such hot solution.

The available sulphur dioxide may be supplied to the sodium sulphide either in gaseous form or in a solution. Thus the available sulphur dioxide may be supplied in a solution of sulphurous acid in water, or in a solution containing sodium acid sulphite with or without some normal sodium sulphite being present therein. By the term "available sulphur dioxide" we mean to include that sulphur dioxide content which is present in the supplied material in excess of that calculated as being combined with available basic material present to form the normal sulphite with such base, e. g., to form normal sodium sulphite with available sodium content. The amount of available sulphur dioxide supplied to the sodium sulphide may be varied considerably, but it is an advantage to supply such an amount as is chemically equivalent to the sodium sulphide or preferably to supply an even larger amount, for example, a sufficiently larger amount to insure that substantially all of the sodium sulphide is acted upon and that the resulting solution is substantially free from sulphide-sulphur. The available sulphur dioxide is advantageously introduced into a hot solution which includes the sodium sulphide at a relatively slow and gradual rate.

During the introduction of the available sulphur dioxide into a hot solution containing sodium sulphide, either with or without sodium carbonate also being contained therein, the alkaline solution is maintained at a sufficiently high temperature, e. g., around the boiling-point, and it is agitated in a vigorous manner so as to rapidly distribute the supplied sulphur dioxide throughout the alkaline solution, thereby minimizing the formation of thiosulphate, and so as to facilitate removing hydrogen sulphide from the solution. The reason for obtaining such results by this method, as compared with those obtained when the available sulphur dioxide is introduced into a solution maintained cool, is not fully understood, but it is perhaps due to the prevention of reaction between available sulphur dioxide and available sulphide in any but small to moderate amount. By removing hydrogen sulphide from the solution at substantially the rate at which it is formed, it seems that reaction between hydrogen sulphide and available sulphur dioxide is minimized, and this may explain the improved results.

Hydrogen sulphide is driven out from the hot solution, the treatment advantageously being so conducted as to drive out from the solution as hydrogen sulphide at least one-half, or preferably more than one-half, of the sulphur content of the sodium sulphide. The hydrogen sulphide may be admixed with water vapor, either with or without some carbon dioxide, and it may also be admixed with other gaseous material such as nitrogen, etc. The amount of such other material which may accompany the hydrogen sulphide will depend upon the circumstances. If sulphur dioxide gases from a sulphur burner are used to treat the hot alkaline solution, the hydrogen sulphide will usually be accompanied by a relatively large amount of nitrogen, the residue from air supplied to the sulphur burner. The hydrogen sulphide may be mixed with sulphur dioxide in such manner and amount as to cause reaction between these two materials so as to form elementary sulphur, and the resulting gases may be treated to collect the elementary sulphur; for example they may be passed thru an electrical precipitator at a temperature above the dew-point of the gases but below the vaporization point of the elementary sulphur, thereby collecting the sulphur and allowing the nitrogen, etc., to pass thru the precipitator. Alternatively, the hydrogen sulphide may be passed into a combustion chamber, especially when it carries relatively little if any nitrogen, such for example as one operated in conjunction with a sulphur burner, and therein burned to form sulphur dioxide. Such sulphur dioxide may be regained in any suitable manner, and it may with advantage be employed for the production of a sulphite of sodium and returned for use in the digesting operation. Thus, such sulphur dioxide may be absorbed in a sodium sulphite solution to form an acid sulphite of sodium and the resulting material may be employed in a digesting treatment of wood, etc., or it may be employed to supply available sulphur dioxide to an alkaline solution containing sodium sulphide or/and sodium carbonate. Some of such sulphur dioxide may be caused to react with hydrogen sulphide to form elementary sulphur and the latter may be regained. Such elementary sulphur may be burned to form $SO_2$ if desired.

After all of the available sulphur dioxide has been introduced into the sodium carbonate-sodium sulphide solution in the manner outlined above, the heating of the liquor and agitation thereof may be continued until substantially all of the sulphide-sulphur has disappeared from the solution. The sodium sulphite solution, thus produced, may be used in whole or in part to absorb sulphur dioxide to form an acid sulphite of sodium, in the manner indicated above, and such acid sulphite of sodium can then be employed for treating sodium carbonate-sodium sulphide solution in a similar manner. By introducing the sodium acid sulphite in the manner described, it is possible to drive out as hydrogen sulphide a substantial and even a preponderating amount of the sulphide-sulphur of the sodium sulphide, thereby converting a substantial portion of the sodium content of the sodium sulphide into a sulphite of sodium.

The amount of available sulphur dioxide thus introduced into the sodium carbonate-sodium sulphide solution may vary considerably. It may range from an amount which is less than is chemically equivalent to the sodium sulphide up to an amount which is chemically equivalent to all of the sodium carbonate as well as the sodium sulphide, and an even larger amount can be thus added when an acid sulphite of sodium is desired as the final result of this step, although the sodium sulphite can be subsequently subjected to a further sulphiting if desired. However, care should be taken to insure that substantially all of the sulphide-sulphur has disappeared from the sodium sulphite solution before an additional amount of available sulphur dioxide is introduced, thus avoiding the simultaneous presence of available sulphur dioxide and available sulphide in such amounts as will form a relatively large amount of thiosulphate by their interaction, or as a result thereof. The solution may be suitably cooled, after sulphide sulphur has been eliminated, and then further sulphited.

Other acid sulphites than sodium acid sulphite can be similarly employed. Thus an acid sulphite of potassium, or an acid sulphite of ammonium, or an acid sulphite of magnesium, etc., or mixtures of various of such acid sulphites can be used for supplying the available sulphur dioxide to the sodium carbonate-sodium sulphide liquor. However, the acid sulphite of sodium will ordinarily be employed owing to its cheapness and to the efficiency which may be had therewith.

The solution which contains the available sulphur dioxide may vary considerably in its ratio or normal sulphite to excess sulphur dioxide, and may range from a solution in which nearly all of the sulphur dioxide is present as normal sodium sulphite up to a solution which contains little or even no normal sodium sulphite. Thus a solution which contains sodium bisulphite may be employed for supplying the available sulphur dioxide as pointed out above.

After removal of the desired portion of the sulphide-sulphur from the solution as hydrogen sulphide, the resulting solution may be sulphited to any desired ratio of combined to uncombined sulphur dioxide, or the sulphiting may be so regulated that substantially all sulphur dioxide is present as sodium monosulphite.

The process of the present invention is an advantageous one for treating solutions of sodium carbonate-sodium sulphide to regenerate a cooking liquor employing a sulphite of sodium, especially when such cooking liquors contain some normal sodium sulphite. By using the process of the present invention it is possible to regenerate the cooking liquors for such cooking operations in a relatively simple and advantageous manner, such that the cyclic process may be readily carried out a plurality of times without thiosulphate building up in cooking liquors of the cycle to a commercially prohibitive degree. It is advantageous to so operate the process that at least one-half of the sulphide-sulphur of the sodium sulphide is driven out from the solution as a volatile sulphide, e. g. hydrogen sulphide.

The following specific example will further illustrate the process of the present invention.

An aqueous solution containing 180. grams per liter $Na_2CO_3$, 46.4 grams per liter $Na_2S$ and 8.4 grams per liter $Na_2S_2O_3$ (the solution being iron-free) was placed in a suitable vessel and heated to the boiling point. While maintaining the solution boiling, there was added slowly through a relatively small opening below the level of the liquor, a volume of aqueous solution, about two and one half times as great as the original solution, containing 50 grams per liter $Na_2SO_3$ and 22.8 grams per liter excess $SO_2$. This latter solution was introduced slowly, and at a relatively uniform rate. While the first portion was being added, very little $H_2S$ appeared in the steam coming from the vessel. This increased gradually, however, until the $H_2S$ came off very copiously, and it continued coming off at a copious rate until a considerable time after the entire amount of $SO_2$ containing solution had been thus added. When the hydrogen sulphide had been substantially all removed, the boiling of the liquor was terminated and the liquor was cooled.

During the boiling of the liquor, water was added from time to time in order to maintain the volume of the liquor about constant. The cooled liquor was carefully analyzed and showed the following composition: 49.8 grams per liter $Na_2CO_3$; 61.3 grams per liter $Na_2SO_3$; 16.3 grams per liter $Na_2S_2O_3$; totaled sodium equivalent to 65.50 grams per liter $Na_2O$.

When the same liquors, specified in the above example, are mixed cold and allowed to stand for several minutes and the resulting solution is then analyzed, either without or after heating to the boiling point, a much larger amount of sodium thiosulphate is shown than was found in the liquor resulting from the treatment shown in the above example as illustrative of the process of the present invention.

When a large amount of material is being treated it is advantageous to pass the solution through the treating vats in a continuous stream. For this purpose a number of vats may be provided with means for conducting the solution in a steady stream from one to another; or a long shallow trough-like vessel may be used. In either case a regular flow of the sulphur dioxide containing material is introduced at suitably spaced points throughout the length of the vessel or of each vessel. The rate of flow of the solution is controlled so that the solution is treated for the required length of time.

The period required for the treatment may be somewhat shortened if the treatment is carried out at a reduced pressure, and for this purpose closed vessels may be used and connected to any suitable exhausting means.

An alternative method may be used for sulphiting a carbonate of sodium derived from a furnacing treatment of residual liquor from a digesting treatment of wood, etc., by means of cooking liquor supplied with a sulphur-bearing compound of sodium, and such alternative method may be employed either alone or in conjunction with the method described above. The furnacing treatment of residual liquor may be carried out on sodium-bearing material derived from either an alkaline cooking operation, or a neutral cooking operation or an acid cooking operation, or in part from one of such cooking operations and in part from another of such cooking operations. The sulphited liquor, obtained by either one or both of the methods herein described, may be employed in whole or in part in either one or more than one of such cooking operations.

Such an alternative method for sulphiting may be carried out in the following manner. A solution which contains sodium carbonate may be subjected to a regulated sulphiting treatment at suitable temperature, e. g. below 60 deg. C., by means of an acid sulphite or by means of sulphur dioxide or in part by each of these so as to form a regulated amount of sodium sulphite in the solution and form some available carbon dioxide. Thus the solution, at or advantageously below 60 deg. C. for example, may be treated with sulphur dioxide until the resulting solution is substantially neutral to phenolphthalein at such temperature, the sulphiting being so conducted as to avoid releasing from the solution any large amount of carbon dioxide. The resulting solution may be considered as containing both normal sodium sulphite and sodium acid carbonate, e. g. $NaHCO_3$. Such resulting solution may then be used to treat a solution which contains both sodium carbonate and sodium sulphid, usually with the former in predominating amount. The two solutions may be mixed and then the mixture heated to drive out $H_2S$, or the solution which contains the sodium sulphite and the acid carbonate may be gradually added to the other solution while the latter is being agitated and boiled. The amount of acid carbonate thus employed is advantageously at least as much as contains an amount of available carbon dioxide as is chemically equivalent to the sodium sulphid, and an even larger amount may be thus used. For example, the amount of available carbon dioxide thus used may be around one and a half times as much as is chemically equivalent to the sodium sulphid, thus facilitating removal of sulphide-sulphur from the solution, although an even larger amount may be used if needed or desired.

After the mixed solutions have been boiled for a sufficient time to eliminate from the solution a preponderating amount or substantially the entire amount of sulphide-sulphur, or otherwise cause it to disappear from the solution, the solution may be cooled in any suitable manner, e. g. by adding a regulated amount of cool water, so that the temperature thereof is brought down to or advantageously below 60 deg. C. Such relatively cool solution may then be subjected to a regulated sulphiting treatment, as indicated above, to again form a solution which contains sodium sulphite and a regulated amount of available carbon dioxide, and the process may be repeated.

As a result of the operation, when carried out in the above manner, a solution is eventually obtained which contains a relatively large amount of sodium sulphite and a relatively small amount of sodium carbonate. Such solution can be further treated or modified in any suitable manner, such for example as subjecting it to a further sulphiting treatment to sulphite the sodium carbonate in whole or in part. Thus the sulphiting may be continued until the solution contains mostly sodium sulphite and little if any sodium carbonate, and if the sulphiting be continued the solution may be obtained containing any desired ratio of free to combined sulphur dioxide. Such sulphited liquors may be used in whole or in part for a cooking operation, after any needed modification or adjustment thereof as may be desired.

When the sodium carbonate-sodium sulphide liquor contains very much more sodium carbonate than sodium sulphide, e. g. around 80 to 90 parts of sodium carbonate to 20 to 10 parts of sodium sulphide, the amount of available carbon dioxide required for treatment of the sodium sulphide may be provided in the treating solution by a regulated sulphiting treatment of but a portion of the solution which results after the hydrogen sulphide elimination treatment, and the other portion of the liquor can be diverted from this local cycle, for example by subjecting such diverted portion of such liquor to a regulated causticizing treatment or to a regulated sulphiting treatment, respectively producing a liquor which contains sodium hydroxide or one in which sodium sulphite or/and an acid sulphite constitutes the chief digesting reagent.

Alternatively, some of the sodium carbonate-sodium sulphide liquor available in the operation of the process in some of its aspects may be causticized without removing sulphide-sulphur therefrom, and such causticized liquor may be used as a cooking liquor either with or without having some sodium sulphite present in such alkaline cooking liquor. When the alkaline cooking liquor is to contain a substantial amount of sodium sulphide as well as sodium hydroxide, the sodium carbonate-sodium sulphide liquor which is to be causticized may advantageously be that which is obtainable from the furnace product which results from a furnacing treatment of residual liquor resulting from a digesting operation in which the chief digesting material is composed of a sulphite material including a substantial amount of a sodium-sulphur compound, e. g. a sulphite of sodium. The residual liquor which results from such an alkaline cooking treatment of wood, etc., may be treated to remove water therefrom and the residue may be furnaced to produce material which includes a relatively large amount of sodium carbonate and a relatively small amount of a sodium-sulphur compound, e. g. sodium sulphide. Such latter type of material may be used to form the solution which is to be treated by the available carbon dioxide, which may be provided in the manner herein outlined. Such solution may be readily treated by the process of the present invention to form a sulphite of sodium type of cooking liquor which contains little if any sodium thiosulphate. Or, when the sulphide content of such solution is relatively low, and particularly where a larger amount of liquor is required for the sulphite cooking process than for the alkaline cooking process, the recovered solution from the latter cooking process may be treated to form a solution containing sodium bicarbonate and sodium monosulphite, and this solution used for treating the sulphide-containing solution recovered from the sulphite cooking process.

The hydrogen sulphide, removed from liquor in the manner above indicated, may be conducted to a combustion chamber operated in conjunction with a suitable sulphur burner, and the sulphur dioxide resulting from combustion of the hydrogen sulphide with that resulting from combustion of sulphur may be utilized in producing a sulphite of sodium in the manner indicated. $H_2S$ and $SO_2$ may be mixed so as to form sulphur.

Soda losses may be replaced by any suitable material and in any suitable manner and at any suitable place in the cycle. Thus a sulphate of sodium may be added to material which is to be subjected to a reducing furnace treatment, thereby producing some sodium sulphide; or sodium carbonate or sodium sulphite may be added to liquor at any suitable point in the cycle, e. g. to material which is to be sulphited to produce a sulphite of sodium. Sodium hydroxide may be added to liquor at any suitable point in the cycle, e. g. to cooking liquor which contains sodium hydroxide with or without sodium sulphide.

Sodium chloride may be used by pulverizing and treating it with a concentrated solution of ammonium sulphite, at relatively low temperature, to form solid sodium sulphite and obtain ammonium chloride in the solution. The solution may then be separated from the solid material in any suitable manner and the sodium sulphite may be washed, if desired, by cold water to remove more ammonium chloride from the sodium sulphite. The sodium sulphite may then be dissolved in water and the solution heated to drive out residual ammonia if any, and such solution may have sodium carbonate or sodium hydroxide added thereto in suitable amount to aid in removing such residual ammonia. The ammonia may be regained in any suitable manner. For example, the ammonium chloride solution may be treated with lime and heated to drive out ammonia. This ammonia and a suitable amount of sulphur dioxide may be absorbed in water maintained relatively cool to a sufficient extent to provide a concentrated solution of ammonium sulphite, and the process may be repeated. The calcium chloride solution may be disposed of in any suitable manner. Such calcium sulphite, if any, as is thrown out as a solid when the ammonium chloride solution is treated with lime, may be used in any suitable manner, for example it may be treated with a sulphate of ammonium, or/and sodium in regulated amount and in the presence of sufficient added sulphur dioxide to form insoluble calcium sulphate which contains substantially all of the sulphate radicle thus added as ammonium sulphate or/and a sulphate of sodium. Such sodium chloride as is present, if any, in the calcium chloride solution may be separated therefrom in any suitable manner, and may be reused. Thus the soda losses may, if desired, be supplied as sodium sulphite obtained from sodium chloride in the manner indicated. Sulphur losses may be supplied in any suitable manner. To the extent that sulphur is supplied as a sulphate and is available in the cycle, such addition of sulphur is an advantageous one.

Additional sulphur may be supplied to the cycle by burning sulphur in a sulphur burner. Also, the gases resulting from the furnacing treatment or treatments may be scrubbed with residual liquor from a digesting operation or/and by a liquor which contains sodium carbonate and/or sodium sulphite. If desired, substantially all of the soda required for producing the sulphite of sodium type of cooking liquor may be produced from salt in the manner indicated, and the sodium carbonate obtained from the residual liquor resulting from a digesting treatment with such cooking liquor may be disposed of in any suitable manner, e. g. it may be marketed, either with or without purification thereof.

While the cyclic process of the present invention may be used in a pulp-mill of the single-liquor type, nevertheless the process makes feasible the operation of a pulp-mill of a multiple-liquor type. In such a multiple-liquor pulp-mill, a portion of the wood may be digested by a cooking liquor of a sulphite of sodium type, either neutral, acid or alkaline to litmus, and another portion of the wood may be digested by means of cooking liquor which contains sodium hydroxide, for example in preponderating amount, and such latter type of cooking liquor may also contain a substantial amount of sodium sulphid and it may or may not have some sodium sulphite therein. The recovered soda may be used in part in each of these types of cooking liquors, and various kinds of wood may be reduced to pulp in such a multiple-liquor mill so as to obtain different kinds of pulp. Such a multiple-liquor pulp-mill is being more fully described in a companion application and the particular method of operating such a multiple-liquor pulp-mill is being claimed in such companion application.

The process of the present invention makes feasible the treatment of an oxysulphur compound of sodium (for examples: sodium sulphite, sodium sulphate, sodium bisulphate, sodium sulpho-organic material) by a reducing furnace treatment in the presence of incandescent carbonaceous material, so as to form a relatively large amount of sodium sulphide. Such sodium sulphide is usually accompanied by some substantial amount of sodium carbonate. The sodium sulphide may be dissolved in a relatively small amount of water so as to form a concentrated solution thereof in hot water (for example around 200 grams, more or less, of sodium sulphide per litre), and such hot sodium sulphide solution may be maintained at the boiling-point and may be vigorously agitated by any suitable means while gaseous sulphur dioxide is being introduced into the hot and boiling solution. The sulphur dioxide gas may be a concentrated sulphur dioxide gas, such as may be obtained by dissolving sulphur dioxide from dilute gases by means of cool water and later heating the solution or reducing the pressure above the solution, or both, and then leading this concentrated sulphur dioxide gas into the hot alkaline solution so as to discharge the gas into the solution at a point considerably below the boiling surface of the solution, and controlling the rate at which the gas is introduced so as to avoid having $SO_2$ pass through the solution in large bubbles and thus be allowed to react with hydrogen sulphide which has been removed from the solution and form elementary sulphur in proximity to the surface of the boiling solution. The sulphur dioxide gases may be added hot and may be relatively dilute, such as gases from a sulphur burner. The hot burner gases may be delivered through a plurality of openings into the solution at or near the lower portion of a tank which contains the alkaline solution, the heat being an advantage and the nitrogen aiding in agitation of the solution. The gases beyond the surface of the solution may be treated in any suitable manner as indicated above.

In one embodiment of the invention, sodium chloride may be treated to form a sulphite of sodium by reacting upon such sodium chloride by means of a concentrated solution of a sulphite of ammonium, to form a solid sulphite of sodium. Ammonium chloride in solution may be removed from the solid sulphite of sodium. The sulphite of sodium may be employed to digest wood, etc., to produce pulp or a pulpy material, and the resulting residual liquor may be treated to remove water, decompose organic matter and the soda may be recovered as a mixture of sodium carbonate and a sodium-sulphur compound, e. g., sodium sulphide. The recovered soda may be treated by means of available $SO_2$, in accordance with a process of the present invention, or such recovered soda may be subjected to a carbonating treatment to remove hydrogen sulphide and convert the sodium sulphide into sodium carbonate. Or, if desired, a portion of the recovered soda may be treated by means of available sulphur dioxide and another portion may be carbonated. Carbon dioxide liberated from sodium carbonate by the available sulphur dioxide supplied thereto, may advantageously be employed to carbonate sodium sulphide to produce sodium carbonate. The carbon dioxide may be dissolved in the sodium carbonate-sodium sulphide solution (i. e., the portion which is to be carbonated) and such $CO_2$ may be delivered into the solution under pressure, and thereafter the carbonated solution may be heated to drive out hydrogen sulphide, leaving sodium carbonate behind. A mixture of carbon dioxide and hydrogen sulphide, obtained by treating sodium carbonate-sodium sulphide solution with available $SO_2$ in a manner disclosed above, may be dissolved in some of the sodium carbonate-sodium sulphide solution, under pressure in a closed-type of tank if desired, and the resulting solution may be thereafter heated or subjected to reduced pressure or both to drive out hydrogen sulphide therefrom and leave the carbonate back. The $CO_2$ may be obtained in any other suitable manner and used in the manner indicated above. Thus calcium carbonate or/and magnesium carbonate may be treated with an acidic material to release carbon dioxide and this may be used to carbonate the sulphide.

Instead of utilizing sodium chloride in the manner above indicated, it may be treated with sulphuric acid to form sodium sulphate and hydrochloric acid. The sodium sulphate may be directly subjected to a reducing treatment to form the sodium sulphide, and the latter may be either carbonated or sulphited, or in part carbonated and in part sulphited, for example, by the method or methods outlined above. The sodium carbonate may be disposed of or utilized in any suitable manner and for any suitable purpose. The sodium sulphite or acid sulphite, or both, may be used to digest wood and to obtain residual liquor which can be treated by a process of the present invention. The hydrochloric acid may be used to treat calcium carbonate, etc., to form the $CO_2$ which is to be used in the carbonating treatment described. Or the hydrochloric acid can be used to treat suitable raw materials to form an acidic solution and the latter can then be used to treat calcium carbonate or/and magnesium carbonate. Thus the hydrochloric acid can be used to treat phosphate rock to dissolve the phosphate content and this acidic solution can be used to treat the alkaline-earth metal carbonate or carbonates to form available $CO_2$ for the carbonating step and also leave an available phosphatic fertilizing material, e. g., dicalcium phosphate which is soluble in citric acid, etc. Instead of using phosphate rock to treat the free acid, e. g. HCl, clay can be treated with the acid to dissolve the alumina content and then the acidic aluminum chloride solution, separated from insolubles, can be used to react with the alkaline-earth metal carbonate or carbonates to precipitate the alumina from the chloride solution. Sodium nitrate can be treated with sulphuric acid to form sodium sulphate and nitric acid, and a similar treatment carried out, calcium nitrate being formed in place of calcium chloride. When a mixture of an available calcium phosphate and calcium nitrate is thus obtained, it can be dried so as to form a mixed fertilizer.

Although the conditions of treatment and the manner of proceeding can be changed in various ways as intimated above, nevertheless it may be stated as a general rule that the most advantageous results are obtained when the solution is maintained alkaline, and at or around the boiling-point, and when the vailable sulphur dioxide is added very slowly and with agitation. The material may be treated in a relatively shallow container. While we do not wish to be bound to any theory, it seems to be advisable to choose the conditions, so far as practicable, so that hydrogen sulphide is removed from a zone before additional available sulphur dioxide is introduced therein, that is, the hydrogen sulphide is removed from the zone, in which available $SO_2$ is present, substantially as fast as it is formed.

This application is a continuation in part of our prior applications Serial No. 686,137 filed January 14, 1924, Serial No. 120,241 filed July 2, 1926, Serial No. 120,242 filed July 2, 1926, Serial No. 248,960 filed January 23, 1928.

We claim:

1. The process of treating a solution containing sodium monosulphide, which comprises adding to such solution maintained at a temperature of at least 60 deg. C., available $SO_2$ in amount sufficient to form a volatile sulphide from the sulphur content of the sodium sulphide.

2. The process of treating a solution containing sodium monosulphide, which comprises adding to such solution maintained at a temperature around 100 deg. C., available $SO_2$, and removing hydrogen sulphide therefrom.

3. The process of treating a solution containing sodium monosulphide, which comprises adding an acid sulphite to such solution maintained at a temperature of at least 60 deg. C., in amount sufficient to form a volatile sulphide from the sulphur content of the sodium sulphide.

4. The process of treating a solution containing sodium monosulphide, which comprises adding an acid sulphite to such solution maintained at a temperature around 100 deg. C., and volatilizing hydrogen sulphide therefrom.

5. The process of treating a solution containing sodium monosulphid, which comprises maintaining the solution at around the boiling point while introducing available $SO_2$ into the solution, and removing a volatile sulphid from the solution.

6. The process of treating a solution containing sodium monosulphide, which comprises agitating the solution while it is substantially non-acid to phenolphthalein and at a temperature of at least 60° C. and simultaneously introducing available $SO_2$ into the solution, and removing a volatile sulphide from the solution.

7. The process of treating a solution containing sodium monosulphide, which comprises gradually introducing into the solution maintained at a temperature of at least 60 deg. C., an acid sulphite with agitation of the solution to remove a volatile sulphide and to convert a substantial amount of the sodium content of the sodium sulphide into a sulphite of sodium.

8. The process of treating a solution containing sodium monosulphide, which comprises gradually introducing into the solution maintained at around the boiling point, an acid sulphite with agitation of the solution to remove a volatile sulphide and to convert a substantial amount of the sodium content of the sodium sulphide into a sulphite of sodium.

9. The process of treating a solution containing sodium monosulphide and sodium carbonate which comprises gradually introducing into the solution maintained at a temperature of at least 60 deg. C., an amount of acid sulphite which is sufficient to form a substantial amount of a volatile sulphide and with agitation of the solution to remove such sulphide to convert a substantial amount of the sodium content of the sodium sulphid and some of the sodium content of the sodium carbonate into a sulphite of sodium.

10. The process of treating a solution containing sodium monosulphide, which comprises gradually introducing into the solution maintained at around the boiling point, an amount of available $SO_2$ which is sufficient to form a substantial amount of a volatile sulphide and to convert a substantial amount of the sodium content of the sodium sulphid and some of the sodium content of the sodium carbonate into a sulphite of sodium, and removing a volatile sulphide from the solution.

11. The process of treating a solution containing sodium monosulphide and sodium carbonate, which comprises maintaining the solution at around the boiling point and introducing into the solution available sulphur dioxide in amount which is sufficient to form a substantial amount of a volatile sulphide and to convert a substantial amount of the sodium content of the sodium sulphide into a sulphite of sodium, and removing a volatile sulphid from the solution.

12. The process of treating a solution containing sodium monosulphide and sodium carbonate, which comprises introducing into such solution maintained at a temperature at least 60 deg. C., and during agitation of the solution, an amount of available sulphur dioxide which is capable of converting a substantial portion of the sodium content of the sodium monosulphid and some of the sodium content of the sodium carbonate into a sulphite of sodium, and volatilizing a preponderating portion of the sulphide-sulphur from the solution as a volatile sulphide, thereby forming a solution which contains more sodium present as a sulphite of sodium than is present as sodium thiosulphate.

13. The method of treating a solution which contains sodium monosulphide, which comprises adding thereto a solution which contains sodium sulphite and an acid carbonate of sodium, mixing the solutions and heating the mixture and removing a volatile sulphide from the solution.

14. The method of claim 13, in which the solution which contains the sodium sulphite and an acid carbonate of sodium is obtained by a regulated sulphiting of a solution which contains a carbonate of sodium, at a temperature not in excess of about 60 deg. C., and which solution was substantially free from sodium sulphid at the start of the sulphiting treatment.

15. The method of treating a solution which contains sodium monosulphide and to the solution a material containing sodium carbonate, which comprises adding sulphite and sodium bicarbonate, removing sulphid-sulphur from the mixture while maintaining it at a temperature of at least 60° C., treating at least a portion of the resulting solution with available $SO_2$ under conditions to form sodium bicarbonate without substantial loss of $CO_2$, and utilizing at least a portion of the solution so formed for treating a solution containing sodium sulphide.

16. The method of treating a solution containing sodium monosulphide and a larger amount of sodium carbonate, which comprises adding thereto a solution which contains sodium sulphite and an acid carbonate of sodium, heating the solution to drive out a volatile sulphide to such an extent that the resulting solution is substantially free from sulphid-sulphur, cooling the resulting solution to at least about 60 deg. C., and subjecting the cooled solution to a sulphiting treatment to form sodium sulphite and an acid carbonate of sodium therein.

17. The method of deriving a sulphite of sodium from sodium monosulphide, which comprises treating such sodium sulphid in the presence of water at a temperature around 100 deg. C. with available sulphur dioxide.

18. The method of deriving a sulphite of sodium from sodium monosulphide, which comprises treating such sodium sulphid in the presence of water at a temperature of around 100 deg. C. by means of available sulphur dioxide supplied to the water in gaseous form.

19. The method of treating a solution containing sodium monosulphid, which comprises maintaining the solution at around the boiling point while introducing gaseous sulphur dioxide into the solution.

20. The method of treating a solution containing monosulphide, which comprises maintaining the solution around the boiling point and in agitation, introducing gaseous sulphur dioxide into such solution in amount sufficient to remove from the solution at least one-half of the sulphide-sulphur as hydrogen sulphide, thereby forming some sulphite of sodium including sodium derived from the sodium sulphide content of the solution.

21. The method of claim 20, in which gases formed by burning sulphur-bearing material to sulphur dioxide by means of air are introduced into the solution at a point or points beneath the surface of the solution.

22. The process of treating a solution containing sodium sulphide and sodium carbonate, which comprises introducing into the solution maintained at at least 60 deg. C. an amount of available sulphur dioxide which is sufficient to form a substantial amount of a volatile sulphide and to convert the greater part of the sodium content of the sodium sulphide and a part of the sodium content of the sodium carbonate into a sulphite of sodium, and removing a volatile sulphid from the solution.

In testimony whereof we affix our signatures.

LINN BRADLEY.
EDWARD P. McKEEFE.

CERTIFICATE OF CORRECTION.

Patent No. 1,892,100.　　　　　　　　　　　　　　　December 27, 1932.

LINN BRADLEY, ET AL.

It is hereby certified that error appears in the printed specification of the above numbered patent requiring correction as follows: Page 1, line 13, for "sulphide" read "sulphite", and line 66, for the misspelled word "oxidied" read "oxidized"; page 8, line 65, claim 15, strike out the words "to the solution a material containing sodium" and insert the same to follow "adding" in line 66, of same claim; and line 108, claim 20, after the syllable "taining" insert the word "sodium"; and that the said Letters Patent should be read with these corrections therein that the same may conform to the record of the case in the Patent Office.

Signed and sealed this 28th day of February, A. D. 1933.

(Seal)

M. J. Moore,
Acting Commissioner of Patents.